United States Patent
Cantolino (10) Patent No.: US 8,220,768 B1
(45) Date of Patent: Jul. 17, 2012

(54) FURNACE RISER

(76) Inventor: Christopher Ralph Cantolino, Bradenton, FL (US)

(*) Notice: Subject to any disclaimer, the term of this patent is extended or adjusted under 35 U.S.C. 154(b) by 499 days.

(21) Appl. No.: 12/620,317

(22) Filed: Nov. 17, 2009

(51) Int. Cl.
*F16M 13/00* (2006.01)

(52) U.S. Cl. ..... 248/636; 248/580; 248/599; 248/188.4; 248/346.01; 248/346.06; 220/565; 220/567; 220/608; 220/628

(58) Field of Classification Search ........... 248/636, 248/580, 599, 638, 677, 678, 679, 188.1, 248/188.4, 346.01, 346.02, 346.03, 346.06, 248/346.4; 220/565, 567, 571, 608, 628, 220/657; 249/33, 205; 110/203, 331; 52/302.1, 52/749.1; 373/73; 126/703
See application file for complete search history.

(56) References Cited

U.S. PATENT DOCUMENTS

| | | | | |
|---|---|---|---|---|
| 6,644,218 B2* | 11/2003 | Gruber | | 108/57.12 |
| 6,719,164 B2* | 4/2004 | Maschio | | 220/571 |
| 7,334,421 B1* | 2/2008 | Cantolino | | 62/259.1 |
| 7,637,387 B1* | 12/2009 | Cantolino | | 220/571 |
| 7,673,646 B1* | 3/2010 | Cantolino | | 137/15.01 |
| 7,900,795 B1* | 3/2011 | Cantolino | | 220/608 |
| 8,100,140 B1* | 1/2012 | Cantolino | | 137/312 |
| 2011/0261361 A1* | 10/2011 | Dixon et al. | | 356/450 |

* cited by examiner

*Primary Examiner* — Teri P. Luu
*Assistant Examiner* — Todd M Epps
(74) *Attorney, Agent, or Firm* — Dorothy S. Morse (57) ABSTRACT

A furnace riser block configured for placement under residential or commercial furnaces and having a generally isosceles trapezoid configuration when viewed from any of its four sides. It is made from strong and lightweight plastic materials that absorb vibration. At least two riser blocks are used together to support a furnace, each having a bottom flange, four corner protrusions, two side protrusions offset from a central location, a deep draft on all four of its sides, a high width-to-height ratio, vertical ribbing that creates a scalloped configuration and increases its vertical loading capability, and multiple indentations in its top surface each configured for receiving a metal jacket riser member that gives an additional inch of clearance when needed in an installation and/or receipt of a vibration isolator. The furnace riser block is stronger, lighter in weight, and safer to handle and ship, than known furnace supports made from metal material.

20 Claims, 6 Drawing Sheets

FURNACE RISER

CROSS-REFERENCES TO RELATED APPLICATIONS

Figure 6:
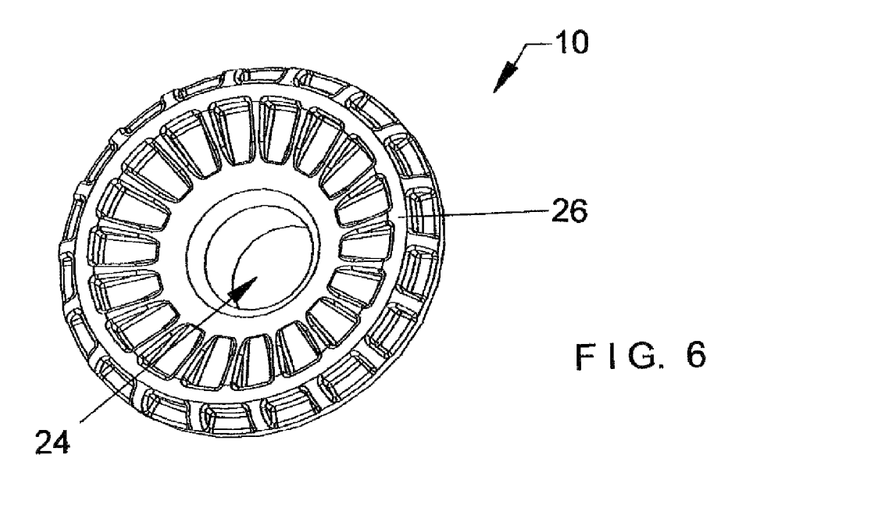
FIG. 6 is a top view of a vibration isolator that can be used with the most preferred embodiment of the present invention furnace riser block to quiet noisy furnaces, showing the center through-hole that is configured for receipt of a metal jacket riser member that can provide additional clearance needed under a furnace unit for piping and p-trap installation.
Figures 7, 8:
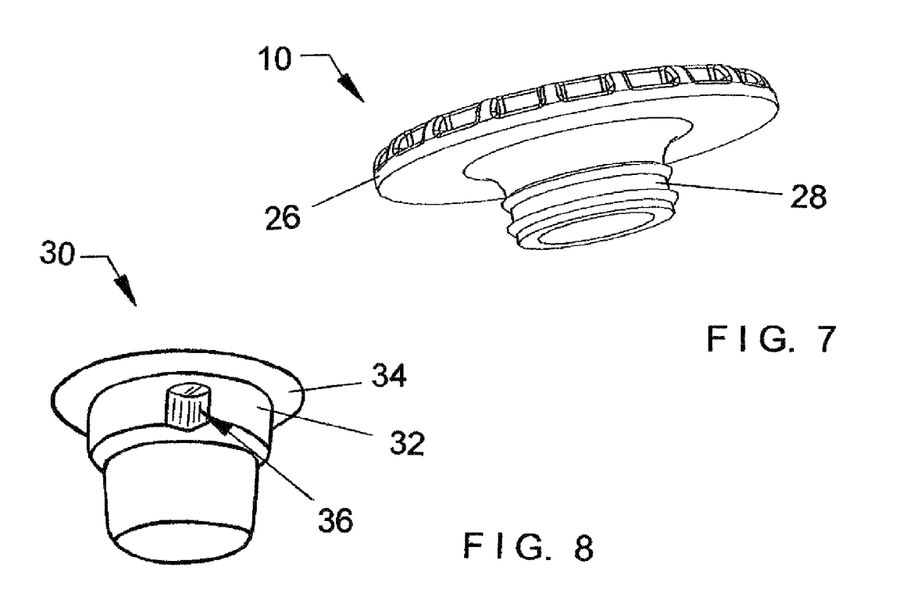
FIG. 7 is a perspective view of the edge and lower portion of the preferred vibration isolator shown in FIG. 6.
FIG. 8 is a side view of a preferred metal jacket riser member that can be used with a vibration isolator and the most preferred embodiment of the present invention furnace riser to provide additional clearance needed under a supported furnace unit for connection of piping and p-traps, or as otherwise dictated by local building code.

The vibration isolator shown in FIGS. 6 and 7 herein is also disclosed in two other currently pending U.S. patent applications of the applicant herein, the first of which has the application number of Ser. No. 12/563,669, a Filing Date of Sep. 21, 2009, and a title of Circular pan, and the second of which has the application number of Ser. No. 12/574,062, a Filing Date of Oct. 6, 2009, and a title of Vibration Isolator.

BACKGROUND

1. Field of the Invention

This invention relates to supports that are used in pairs or other multiples to elevate a residential or commercial heating system and allow clearance beneath it to accommodate piping and p-traps and/or meet local building code requirements, specifically to a strong furnace riser block made from plastic materials and molded construction that is configured for placement with one or more other riser blocks under a residential or commercial furnace unit to provide many advantages for installers, including helping to make furnace installations faster and easier without compromised durability or furnace stability, and also without reduced strength or increased cost over the use of prior art metal furnace supports. Similar to some prior art metal furnace supports, present invention riser blocks have a hollow interior and a generally isosceles trapezoid configuration when viewed from any of its four sides, which together allow compact nesting during storage and transport. Yet, as a result of their molded construction, present invention riser blocks are also able to have integral structural features that overcome a problem experienced with prior art metal furnace supports wherein adjacent supports become stuck together and delay installation. Additional features incorporated into present invention riser block design, which are also known in prior art furnace supports, are a deep draft on all four of its sides and an outwardly-directed bottom flange. However, unlike prior art metal furnace supports, which are heavy to move and lift during installation and may also experience a shortened useful life due to a susceptibility to rust and corrosion, present invention furnace riser blocks are lightweight and made from sturdy and durable plastic material that will not rust or crack, they absorb vibration and noise to quiet noisy furnace units, and they also are able to withstand wide ambient temperature variations without reduced performance. Present invention riser blocks further have a large width-to-height ratio, due in part to an enlarged flange width over that observed in prior art metal furnace supports, which provides increased stability for the lightweight riser blocks and is particularly helpful for allowing present invention riser blocks to stay in their designated positions as a heavy furnace is moved across them into its desired position of use. In addition, present invention riser blocks have a flange purposely configured with non-sharp edges and corners to reduce damage to surroundings and installer injury during their handling, vertical ribbing that creates a scalloped configuration to increase/maximize vertical loading capability, and multiple indentations in their top surfaces each dimensioned and shaped for receiving a vibration isolator, or a combination of vibration isolator and mounted metal jacket riser member, which can provide additional clearance under a furnace when required by local building code and/or installation site limitation. Although preferred to quiet noisy furnace units, and unless they are needed to mount a metal jacket riser member within an indentation for added clearance beneath a furnace unit, use of vibration isolators with present invention riser blocks is optional. Furthermore, unless a very large furnace unit is to be installed, not all of the indentations in a present invention riser block will be used to support the furnace unit, and it will be the installer's choice to select which of the indentations present are best suited to support of the furnace unit's weight and provide ideal positioning of the furnace unit for facilitated piping and p-trap connections. Thus, present invention riser block configuration provides many more advantages for furnace installers to reduce their business operating cost than prior art metal furnace supports. First, as a result of structural and material choices disclosed herein, present invention furnace riser blocks are strong and durable, and they have been shown to be ten times stronger than known metal furnace supports. Also, their manufacturing cost is comparable to (or less than) prior art metal furnace supports, particularly when multiple present invention riser blocks are made from one sheet of plastic material for cost efficient manufacture. In addition, present invention riser blocks are configured for instant adaptability with vibration isolators and metal jacket riser members, so that one-size-fits-all for easy and prompt installation of different sizes of furnace unit and facilitated connection of piping and p-traps even when installation site limitations are encountered.

2. Description of the Related Art

Furnaces currently installed in residential and commercial buildings are often part of HVAC systems that perform a combination of heating, ventilating, and air conditioning functions. Furthermore, furnaces are selected for installation according to the volume of air in a building that requires temperature and humidity modification, and as a result furnaces can vary widely in size, weight, and perimeter configuration. In addition, many furnaces also require a clearance of at least six to seven inches beneath them to accommodate piping and p-traps. Since furnaces are heavy and time consuming to install, any technology improvements that facilitate furnace installation are appreciated by installers, including improvements that standardize installation for different sizes of furnace unit, as well as improvements that make furnace installations faster and more cost efficient to perform. The present invention furnace riser block is such a technology improvement and provides many advantages to installers to help them accomplish furnace installations more efficiently and with less physical effort, as well as with increased cost efficiency and reduced time spent at an installation site.

Furnace supports made from metal are widely known and in current use to provide the clearance needed for running piping and p-traps beneath a furnace unit, or as otherwise dictated by local building code. While known metal furnace supports are non flammable and provide other benefit to installers, present invention riser blocks made from molded plastic provide installer with many additional advantages and improvements. In addition to being heavy to lift and move during installation, known metal furnace supports have sharp edges and corners capable of injuring an installer, damaging surroundings, and/or sufficiently digging into a plastic fluid collection pan placed under a furnace unit to cause premature pan failure. Also, metal furnace supports are known to rust or crack after extended use, and they do not provide any vibration dampening to quiet noisy furnaces. Furthermore, should an installer have an installation where higher furnace clearance is required by local building code or unexpected installation site limitation, metal furnace supports have no readily available feature to use for providing a quick remedy. In contrast, present invention furnace riser blocks are made from durable and strong load-bearing plastic material that will not rust or crack, and which is further unaffected by exposure to temperature extremes. In addition, present invention riser blocks each have several alternatively used top surface indentations at each end thereof that are configured to receive a vibration isolator, or a combination of a vibration isolator and a metal jacket riser member mounted thereon. The selection of indentations provided by present invention riser blocks enhances their versatility to accommodate different sizes of furnace unit, installed furnace positioning, and variable clearance requirements. Furthermore, present invention riser blocks and vibration isolators to be used therewith are configured to reduce the development of stress cracks in the riser blocks, as well as in any fluid collection pan placed beneath them, during furnace installation as a heavy furnace unit is moved across their top surfaces. In addition, the large width-to-height ratio of the spaced-apart, lightweight, and independently positioned present invention riser blocks (which are not placed in physical contact with one another during furnace unit support) helps each one to maintain its stability and desired positioning during furnace unit installation and use. Furthermore, the structural features of the present invention riser blocks have been selected to minimize pressure points and keep thin or weak spots from developing in its material as its multi-level structure is formed, which could otherwise lead to crack development, premature material deterioration, and/or riser block failure during extended use. Additional goals guiding the selection of structural features and materials to be used as a part of the present invention riser blocks include a sturdy construction that facilitates installation, shortens installation time, provides stable installation, provides trouble-free long-term use, and minimizes maintenance after installation. Another objective for present invention manufacture is to produce a riser block that will last as long as the useful life of the furnace unit it supports, which present invention riser blocks are expected to do. Trying to develop a plastic riser block that was comparable (or lower) in cost to allow competition in the marketplace with prior art metal furnace supports was also a challenge to the inventor herein, since present invention riser blocks needed to be made from non-flammable material that is unaffected by exposure to wide temperature fluctuations, have the strength to support a heavy furnace unit during extended use measured in years with little or no inspection/maintenance, and be easily adaptable to provide additional clearance beneath a furnace unit in selected applications where needed by local code or installation site limitation. In addition, the inventor herein wanted nesting capability for compact riser block storage and transport without adjacent riser blocks sticking together, vibration dampening capability that would help to quiet for noisy furnaces, and structural design features that allow plastic to be pulled in optimal directions during manufacture from a single sheet of material so that the resulting material in the rise block after manufacture lacks pressure points and weak spots, allowing it to support a heavy furnace unit during extended use measured in years. No other furnace riser block is known with the same structure, to function in the same manner, or provide all of the features and advantages of the present invention.

BRIEF SUMMARY OF THE INVENTION

It is the primary object of this invention to provide a furnace riser block of sturdy construction that can be used in pairs (or larger multiples) for long-enduring and stable support of a heavy furnace unit, preferably as long as the useful life of the furnace unit it is intended to support. It is a further object of this invention to provide a furnace riser block that has an integrated structure allowing it to effectively fulfill its intended function while resisting permanent deformation, cracking, and/or material weakening as a result handling anticipated during installation, pre-installation transport, and/or storage. It is also an object of this invention to provide a furnace riser block with design and material selection that facilitates manufacture and enables stable installation, facilitates installation, shortens installation time, facilitates piping and p-trap connection, and requires minimal post-installation inspection or maintenance. A further object of this invention is to provide a furnace riser block that has a nesting structure to allow compact transport and storage in stacked array, as well as structural provisions that prevent adjacent riser blocks from sticking together while nested. In addition, it is a further object of the present invention to provide a furnace riser block made from crack resistant, corrosion resistant, non-flammable, fire resistant, and extremely durable materials that resist premature deterioration and malfunction, as well as have resistance to ambient temperature extremes. It is a further object of this invention to provide a furnace riser block that is easily adaptable to accommodate different sizes of furnace unit or provide additional clearance under a furnace unit as dictated by local code or installation site limitation. It is also an object of this invention to provide a furnace riser block that assists in quieting noisy furnace units. A further object of this invention is to provide a furnace riser block configured for substantially reduced injury to installers and to surroundings, and no damage to a fluid collection pan placed under the furnace unit.

The present invention, when properly made and used, will provide an improved and reliable furnace riser block of durable plastic materials and molded construction that can be used at least in pairs (also in multiples of three or more) to elevate a residential or commercial heating system and allow clearance beneath it for running piping and p-traps. Present invention riser blocks provide many advantages to furnace installers, including facilitated installation, shortened installation time, stable installation, trouble-free long-term use, and minimized maintenance after installation. In addition, present invention furnace riser blocks have a wide flange around its lower end that broadens the base of the lightweight riser block for increased riser block stability. Their flanges also lack sharp edges and corners so that no part of them will be able to injure an installer, damage surroundings, and/or dig into the plastic material of a fluid collection pan positioned under them and cause puncturing or other material weakness in the pan that could lead to its premature failure, as is possible with known metal furnace supports. In addition, present invention furnace riser blocks are made from durable and strong load-bearing plastic materials that absorb vibration, and in addition each has multiple alternatively used indentations on its top surface configured to receive vibration isolators that further quiet a noisy furnace unit. The lightweight plastic materials used in present invention riser blocks promote easier handling and transport to an installation site than prior art metal furnace supports. Also, should additional clearance be needed in any furnace installation by local building code or as a result of installation site limitation, one or more optional metal jacket riser members can be easily mounted on top of a vibration isolator supported within each indentation selected by the installer for use. A deep draft on all sides of a present invention furnace riser block helps it to accept larger air handlers, while vertical ribbing that creates a scalloped vertical profile increases its structural strength for enhanced vertical loading. The advantages present invention riser blocks provide to installers are many, including helping to make furnace installations faster and easier without compromised durability or furnace stability, reduced strength, or increased cost. Similar to some prior art metal furnace supports, present invention riser blocks have a hollow interior and a generally isosceles trapezoid configuration when viewed from any of its four sides, yet as a result of their molded construction, present invention riser blocks are also able to have integral structural features (such as small protrusions of varying mismatched configuration or location) that overcome a problem experienced with prior art metal furnace supports wherein adjacent supports become stuck together and delay installation. Each successive riser block in a stacked present invention array would then be rotated 180-degrees relative to the one above it, as well as relative to the one below it, to allow immediate release of individual riser blocks from a stack when needed. Additional features incorporated into present invention riser blocks, which are also known in prior art furnace supports, are a deep draft on all four of its sides and an outwardly-directed bottom flange. However, unlike prior art metal furnace supports, which are heavy to move and lift during installation and may also experience a shortened useful life due to a susceptibility to rust and corrosion, present invention furnace riser blocks are lightweight and made from plastic material that will not rust or crack, they absorb vibration and noise to quiet noisy furnaces, and they further remain unaffected when exposed to a wide temperature variations. Present invention riser blocks further have a large width-to-height ratio as a result of an enlarged flange width that provides increased stability as a heavy furnace is moved over it during installation, a flange purposely configured with non-sharp edges and corners to reduce installer injury and damage to surroundings, vertical ribbing that creates a scalloped configuration to increase/maximize vertical loading capability, and multiple indentations in its top surface each shaped and dimensioned for receiving a vibration isolator, or a vibration isolator in combination with a mounted metal jacket riser member, the use of which quickly and easily provides additional clearance under a furnace when dictated by local building code or the installation site. Thus, one present invention riser block is able to meet a variety of installation needs, and installers using present invention riser blocks for furnace installations can reduce operating costs by not having to maintain a large inventory of furnace supports to accommodate differing sizes of furnace unit or a building code in neighboring locale that requires different clearance requirements. Furthermore, the structural features of present invention riser blocks were developed to allow just enough material to be pulled during manufacture to prevent pressure points and also reduce weak spots in the riser block material as the multi-level structure of the present invention riser block is formed, and as a result of these structural and material choices, the present invention furnace riser block has been demonstrated to provide ten times the strength of known metal furnace supports.

The description herein provides preferred embodiments of the present invention but should not be construed as limiting its scope. For example, variations in the thickness dimension of the sheet material used to form a present invention furnace riser block; the number of indentations used in the top surface of each riser block; the diameter, configuration, and depth dimensions of the indentations used; the height, length, and width dimensions of the riser block as long as a high width-to-height ratio is maintained for enhanced riser stability; the width and thickness dimensions of the outwardly-directed flange as long as riser block stability is maximized and an excess of material is not used; the positioning and configuration of vertical ribbing present; and the number, size, location, and configuration of small projections used near the flange/wall interface to avoid the sticking together of compactly stacked riser blocks, other than those shown and described herein, may be incorporated into the present invention. Thus, the scope of the present invention should be determined by the appended claims and their legal equivalents, rather than being limited to the examples given.

BRIEF DESCRIPTION OF THE DRAWINGS

FIG. 1 is a perspective view of the most preferred embodiment of the present invention furnace riser block having side and end walls with a generally isosceles trapezoid configuration, as well as vertical ribbing that creates a scalloped vertical profile and increased structural strength for enhanced vertical loading, a wide flange extending outwardly from the base of each side to broaden it, indentations in its top surface each configured to receive a vibration isolator or a combination of vibration isolator and mounted metal jacket riser member, with a vibration isolator shown inserted within three of the top surface indentations, and protrusions at the wall/flange interface that have mismatched location and/or orientation to help prevent the sticking together of adjacent riser blocks when they are in a compactly stacked array.

COMPONENT LIST

2—most preferred embodiment of the present invention furnace riser block

4—vertically-extending and sloped/tapered wall of riser block 2 (each of which has the general configuration of an isosceles trapezoid)
6—indentation in top surface 14 that is configured to receive a vibration isolator 10
8a—non-centered side protrusion used to prevent adjacent riser blocks 2 from sticking together in compactly stacked array
8b—end protrusion having mismatched configuration and/or location, which is used to help prevent adjacent riser blocks 2 from sticking together in stacked array
10—vibration isolator used in association with indentations 6 to support and quiet noisy furnace units 18
12—outwardly-extending flange at the base of wall 4
14—top surface of furnace riser block 2
16—vertical ribbing that creates a scalloped configuration in sloped/tapered wall 4
18—furnace unit
20—fluid collection pan
22—roof rafter
24—center through-hole in vibration isolator 10
26—enlarged upper portion of vibration isolator 10
28—narrowed lower portion of vibration isolator 10
30—metal jacket riser member (used with vibration isolator 10 to provide added clearance beneath a furnace unit 18)
32—widened upper configuration of a metal jacket riser member 30
34—top flange outwardly depending from the widened upper configuration 32 of a metal jacket riser member 30
36—crimped indentation in metal jacket riser member 30

DETAILED DESCRIPTION OF PREFERRED EMBODIMENTS

Figure 2:
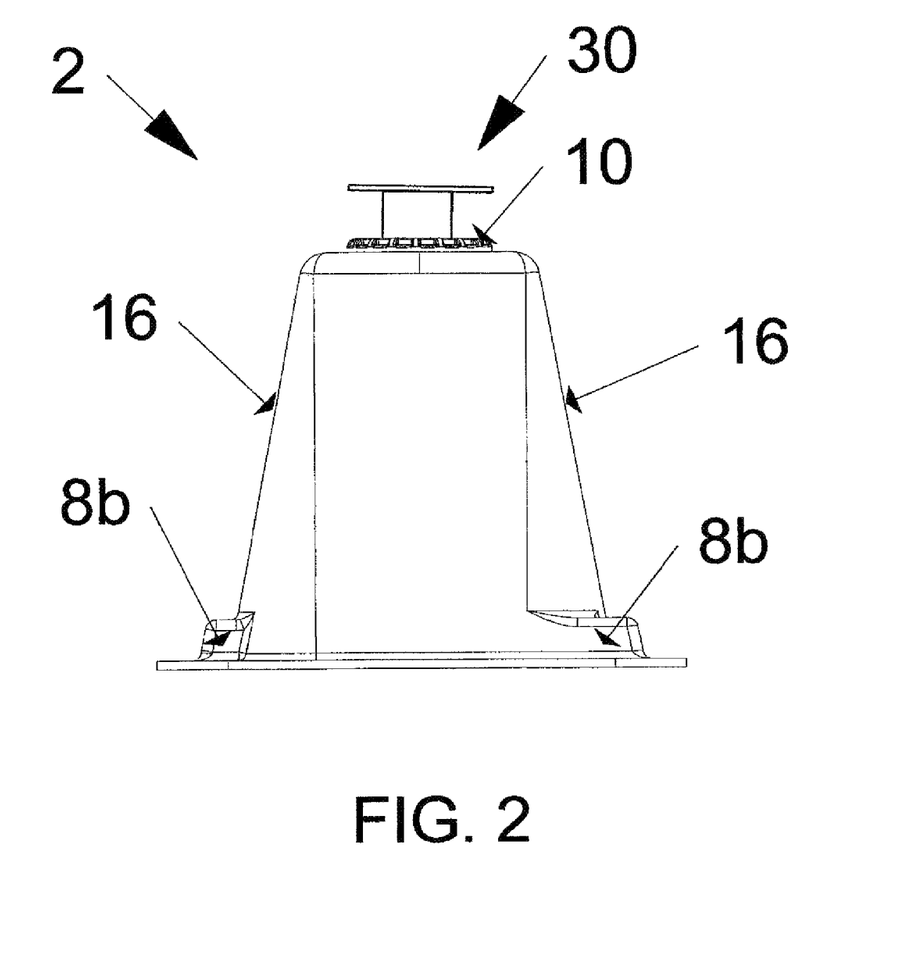
FIG. 2 is an end view of the most preferred embodiment of the present invention furnace riser block, with one vibration isolator extending above the riser block's top surface, and a metal jacket riser member shown immediately above the vibration isolator.

The present invention provides an improved and reliable furnace support configuration in the form of a riser block 2 made from durable, impact-resistant plastic materials and molded construction that can be used in pairs and larger multiples to elevate a residential or commercial heating system (such as but not limited to the furnace unit 18 shown in FIG. 5) and allow clearance beneath it for running piping and p-traps (not shown). Present invention riser blocks 2 are configured and sized to allow just enough material to be pulled during manufacture to prevent pressure points and weak spots, and as a result, present invention furnace riser blocks 2 are ten times as strong as known metal furnace supports. Lightweight but sturdy present invention riser blocks 2 provide many advantages to furnace installers (not shown), including facilitated installation, shortened installation time, stable installation, trouble-free long-term use, and minimized maintenance after installation. In addition, present invention furnace riser blocks 2 have a wide flange 12 extending from each of its opposed side walls 4 that together broaden the base of the lightweight riser block 2 for increased stability. Flanges 12 also lack sharp edges and corners to reduce installer injury, minimize damage surroundings, and/or prevent digging into the plastic material of a fluid collection pan (such as but not limited to the pan 20 shown in FIG. 5) positioned under them and cause puncturing or other material weakness in pan 20 that could lead to its premature failure, as may occur as a result of metal furnace support use. In addition, present invention furnace riser blocks 2 are made from strong load-bearing plastic materials that absorb vibration, and in addition each has multiple selectively used indentations 6 on its top surface configured to receive a vibration isolator 10 to further quiet a noisy furnace unit 18. Furthermore, should additional clearance be required in any furnace 18 installation by local building code or installation site limitation, one or more optional metal jacket riser members 30 (see FIG. 8) can be easily mounted on top of a vibration isolator 10 supported within each indentation 6 selected by the installer for such use (as shown in FIG. 2). All four walls 4 of a present invention furnace riser block 2 have a deep draft that helps it to accept larger air handlers/furnace units 18, while vertical ribbing 16 that creates a scalloped vertical profile increases its structural strength for enhanced vertical loading. 'Scalloped vertical profile' is defined herein as a continuous series of circle segments or other arcuate projections when riser block 2 is viewed from above or in cross-section. Similar to some prior art metal furnace supports (not shown), present invention riser blocks 2 have a hollow interior and a generally isosceles trapezoid configuration when viewed from any of its four walls 4, yet as a result of their molded construction, present invention riser blocks 2 have the added feature of small protrusions at the wall/flange interface that prevent adjacent riser blocks 2 from sticking together in stacked array. Unlike prior art metal furnace supports, which are heavy to move and lift during installation and may also experience a shortened useful life due to a susceptibility to rust and corrosion, present invention furnace riser blocks 2 are lightweight and will not rust or crack, are non-flammable, are non-flammable, absorb vibration and noise, are fire resistant, and further remain unaffected when exposed to a widely varying temperature fluctuations.

Figure 3:
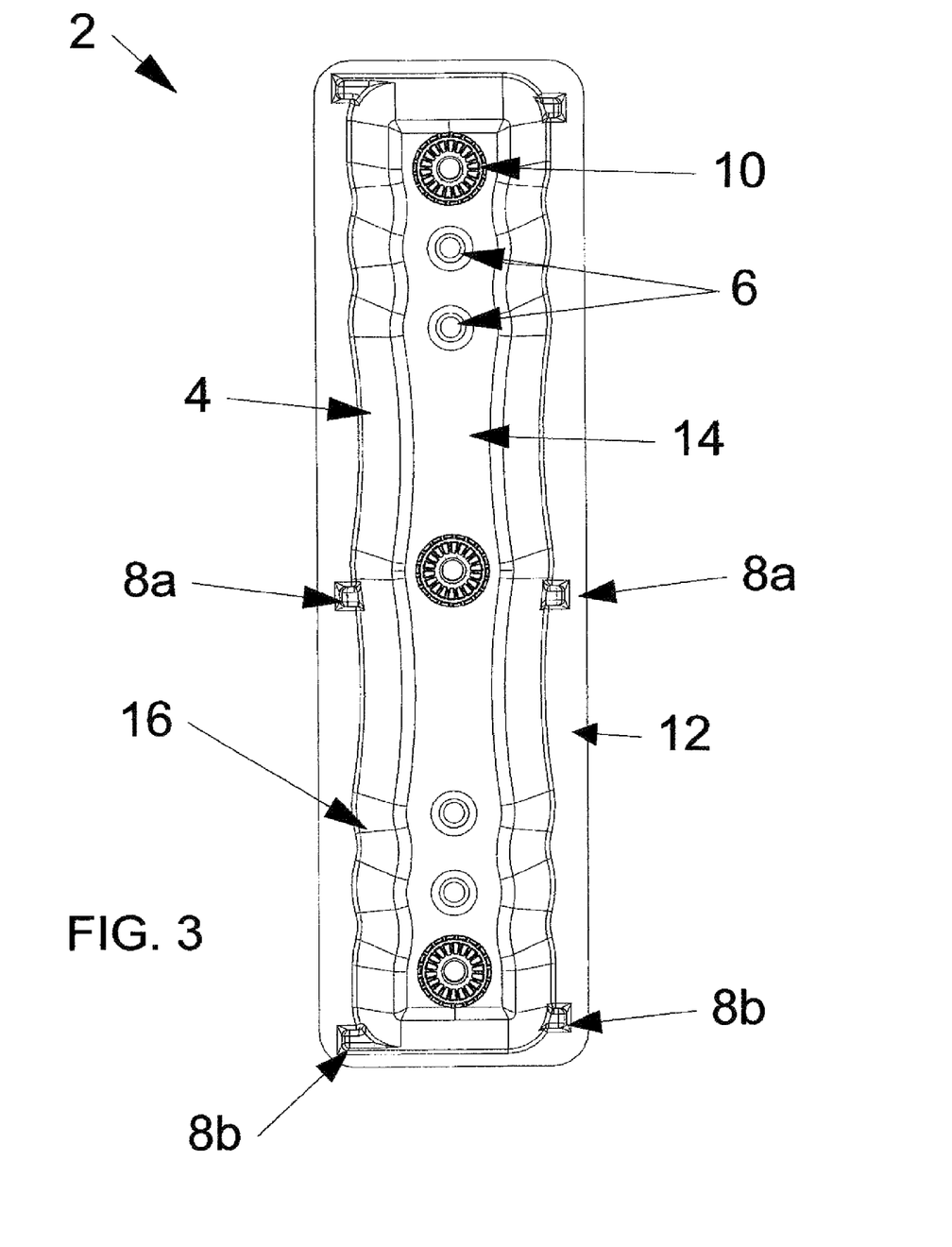
FIG. 3 is a top view of the most preferred embodiment of the present invention furnace riser block that shows the wide flange structure adjacent to each side wall, mismatched protrusion placement and/or configuration, downwardly sloping surfaces on all walls of the riser block between its top surface and flange, and three of its top indentations supporting a different vibration isolator.
Figure 4:
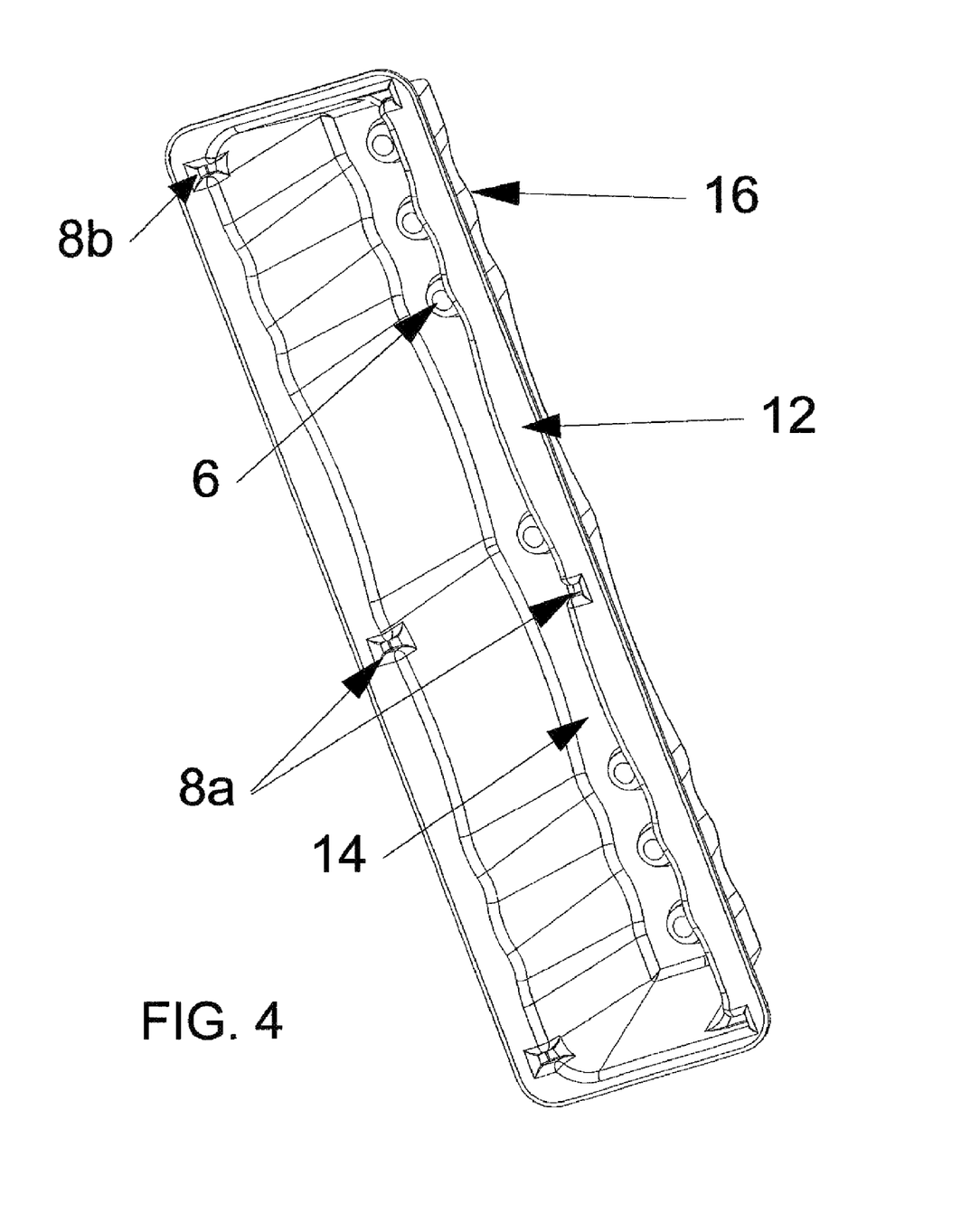
FIG. 4 is a bottom view of the most preferred embodiment of the present invention furnace riser block showing its hollow interior and the small indents of mismatched configuration and/or positioning (that result in the protrusions shown on the outside surface of the flange/wall interface) which are used to prevent adjacent riser blocks from sticking together in stacked array.
Figure 5:
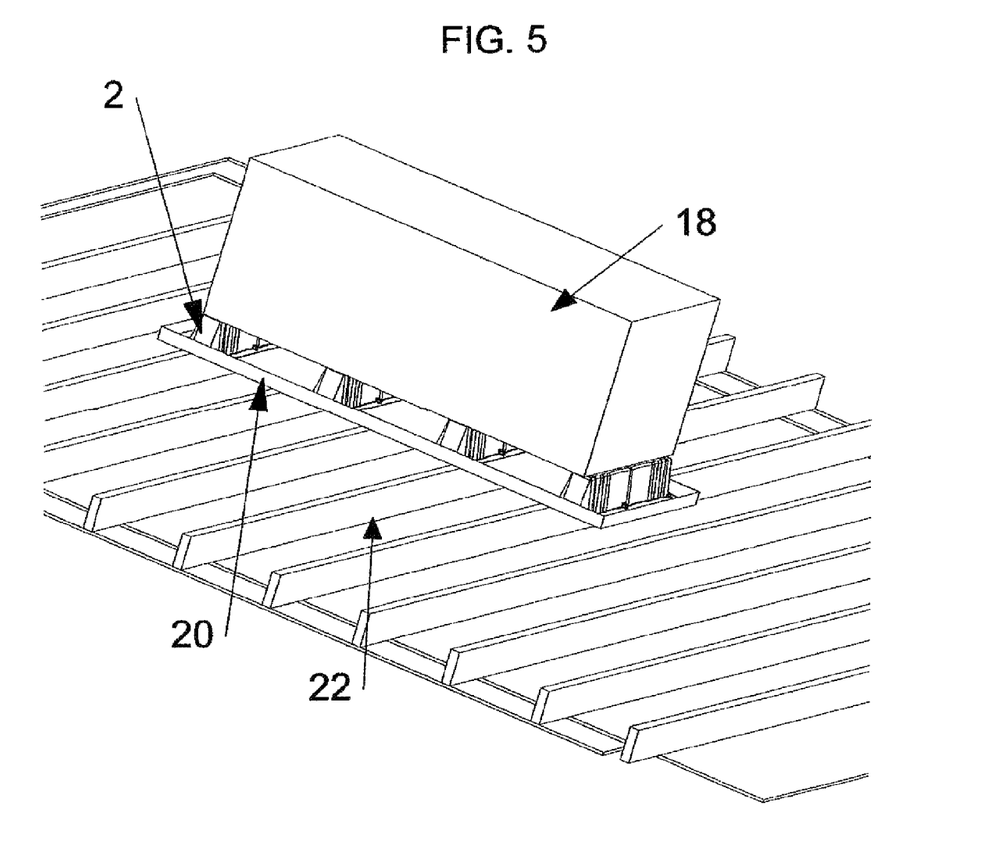
FIG. 5 is a perspective view of four independent present invention furnace riser blocks spaced-apart from one another in a fluid collection pan that is set upon adjacent roof rafters, with the weight of a furnace supported across the top surfaces of the spaced-apart riser blocks.

While FIGS. 1-4 show the most preferred embodiment of the present invention riser block 2, FIG. 5 shows four spaced-apart riser blocks 2 in substantially parallel array supporting a furnace unit 18, with a fluid-collecting pan 20 positioned under all four riser blocks 2 and fluid-collecting pan 20 supported by multiple roof rafters 22. Furthermore, FIGS. 6 and 7 show an example of a preferred vibration isolator 10 that is contemplated for use with the present invention riser blocks 2 in association with the indentations 6 on their top surfaces 14, while FIG. 8 shows an example of a preferred metal jacket riser member 30 that can be used as a part of the present invention while mounted within the center through-hole 24 of a vibration isolator 10. It is to be understood that many additional variations in the present invention are possible and also considered to be a part of the invention disclosed herein, even though such variations are not specifically mentioned or shown. As a result, a reader should determine the scope of the present invention by the appended claims.

Figure 1:
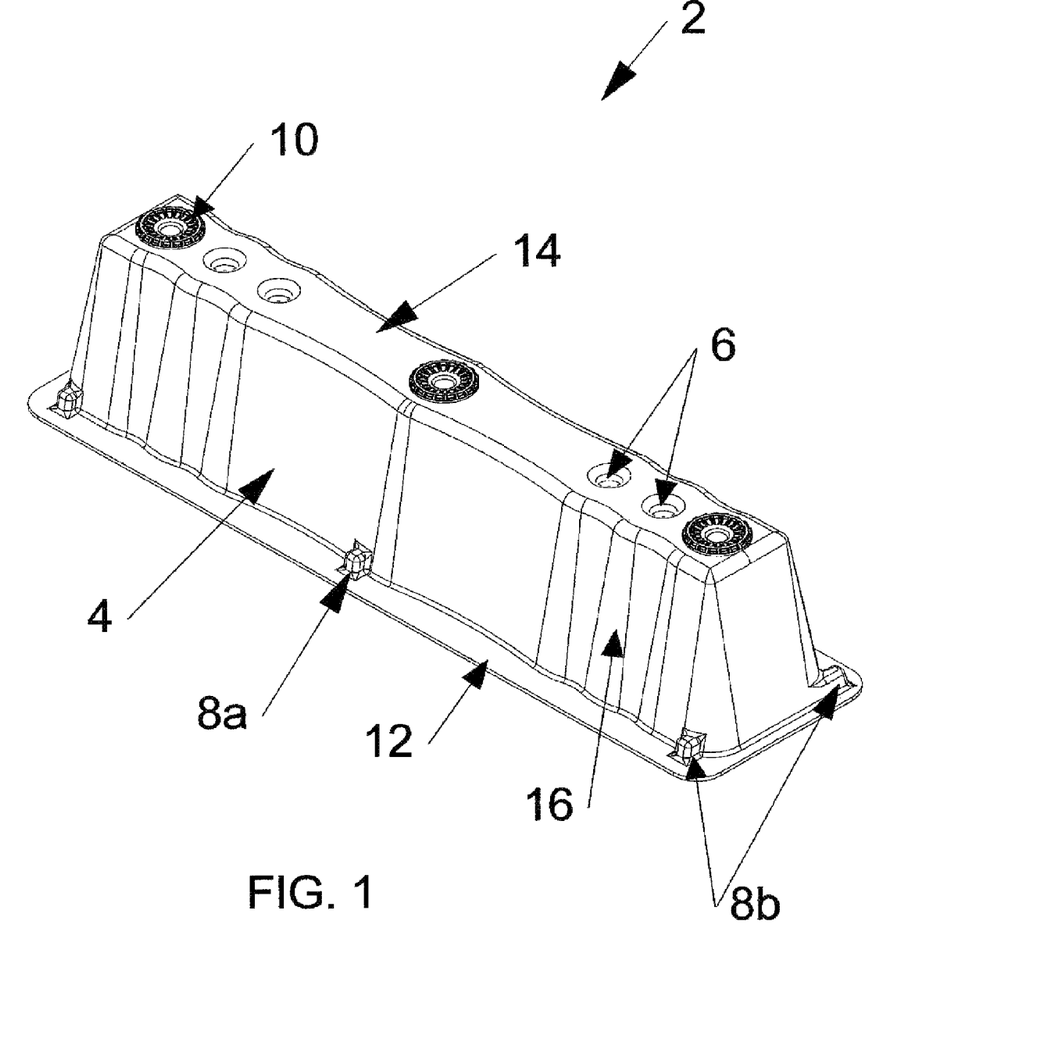

FIGS. 1-4 show differing views of the most preferred embodiment of the present invention riser block 2, with FIG. 5 showing several present invention riser blocks 2 supporting a furnace unit 18. FIG. 1 is a perspective view of the most preferred embodiment of the present invention furnace riser block 2 having four sloping/tapered walls 4 each with a generally isosceles trapezoid configuration, as well as vertical ribbing 16 that creates a scalloped vertical profile and increased structural strength for enhanced vertical loading. The number of riser blocks 2 selected for use with each furnace unit 18 relates to the perimeter configuration and weight of a furnace unit 18 to be supported, and a large furnace unit 18 may need four present invention riser blocks 2 for proper support (as shown in FIG. 5). The size and configuration of vertical ribbing 16 may be varied from that shown in FIG. 1, as long as strength characteristics of riser blocks 2 are not reduced. FIG. 1 also shows present invention riser block 2 having a wide flange 12 extending outwardly from the bottom portion of each side wall 4 to increase the width-to-height ratio for increased stability. The portion of flange 12 extending outwardly from the bottom portion of each end wall 4 may have the same width dimension as that connected to each side wall 4, or not. When used for support of a large furnace unit and a fluid collection pan 20 (see FIG. 5) is placed underneath all riser blocks 2, the portion of flange 12 extending outwardly from the bottom portion of each end wall 4 may be smaller in width dimension than the flange 12 extending outwardly from the bottom portion of each side wall 4, as shown in FIG. 1. However, the end portions of flange 12 may also be the same or larger than the side portions of flange 12. FIG. 1 also shows multiple indentations 6 in the top surface 14 of riser block 2 each configured to receive a vibration isolator 10 or a combination of a vibration isolator 10 and metal jacket riser member 30 (mounted to its associated vibration isolator 10 as shown in FIG. 2). Vibration isolators having configuration other than that shown for vibration isolator 10 in FIG. 1 may also be used with indentations 6, although the one shown in FIG. 1 is most preferred. Although not shown, more than one vibration isolator 10 and more than one metal jacket riser member 30 may be used in stacked array in a single indentation 6, as long as the other indentations 6 intended for support of a heavy furnace unit 18 have the same array composition. FIG. 1 further shows all indentations 6 to be visually similar in size and arranged so that one indentation 6 is in a centrally located position on the top surface 14 of riser block 2, with the remaining indentations 6 divided into two laterally positioned groups thereof each having three indentations 6 spaced-apart from one another, and each group also having an end one of its indentations 6 positioned very close to a different one of the opposing end walls 4. Although there are seven indentations 6 shown in FIG. 1, only three have a vibration isolator 10 inserted therein, and it is contemplated for the indentations 6 in each end grouping to provide the adaptability needed for support of different sizes of furnace unit 18. Thus, both of the indentations 6 most remote from one another in each lateral grouping thereof would be used to support a very large furnace unit 18. However, different combinations of the indentations 6 in each grouping thereof would be selected for use in supporting smaller furnace units 18, with a furnace unit 18 centered upon riser block 2 between its two ends walls 4, or perhaps not should off-center positioning be most suitable for an installation. Furthermore, indentations 6 may have a straight-walled, stepped, or tapering configuration, or a combination thereof. Also, the depth dimensions of indentations 6 in different embodiments of the present invention may vary, although it is contemplated for the indentations 6 in the top surface 14 of the same riser block 2 to all be similar in size and configuration so that an installer would not need to carry different sizes of vibration isolator 10 or metal jacket riser member 30 to an installation site. In addition, although the seven indentations 6 and positioning therefore shown in FIG. 1 are preferred, the number, size, location, and relative positioning of indentations 6 in various preferred embodiments of the present invention can be different from that shown. Furthermore, FIG. 1 shows several protrusions 8a and 8b at the interface of wall 4 and flange 12 that have mismatched size, configuration, location, and/or orientation relative to one another to help prevent the sticking together of adjacent riser blocks 2 when they are in a compactly stacked array rotated 180-degrees from one another. One protrusion 8a is shown in a centrally located position, while protrusions 8b are each situated near an end wall 4. Preferred positioning for one protrusion 8a and one protrusion 8b that are hidden from view in FIG. 1, can be easily seen in FIG. 3. Furthermore, as can be determined from FIG. 1, the two protrusions 8b closest to a viewer on the right side of the illustration are different in configuration. The protrusion 8b extending toward a viewer depends outwardly from the side wall 4, while the protrusion 8b extending away from a viewer appears to depend at least in part from the end wall 4. Although not shown in FIG. 1, but visible in FIG. 3, each central protrusion 8a is in an opposed position from the other protrusion 8a, with both of them in a slightly off-center position between the two end walls 4. As a result of the differences in configuration and location, when alternate riser blocks 2 in a stack are rotated 180-degrees from one another, protrusions 8a and 8b are able to maintain stacked riser blocks 2 from sticking to one another and make each riser block 2 immediately available for use. The number, size, location, and configuration of protrusions 8a and 8b used as a part of the present invention are not limited to that shown in FIG. 1.

In contrast to FIG. 1, FIG. 2 is an end view of the most preferred embodiment of the present invention furnace riser block 2, with one vibration isolator 10 extending above the riser block's 2 top surface 14 (identified by number in FIG. 1), and a metal jacket riser member 30 mounted centrally within the vibration isolator 10. Although not limited thereto, it is contemplated for each metal jacket riser member 30 used to raise a supported furnace unit 18 approximately one inch. Several metal jacket riser members 30 can be positioned in stacked array within one vibration isolator 10 to raise a furnace unit 18 more than one inch. Multiple vibration isolators 10 can also be used in stacked array within the same indentation 6. FIG. 2 shows the flange 34 (refer to FIG. 8) of metal jacket riser member 30 having a similar diameter dimension as the upper portion 26 of vibration isolator 10. However, while it is preferred for both to have a wide diameter dimension for remaining in a fixed position and increased stability during use, the diameter dimensions of flange 34 and upper portion 26 are not limited to that shown in FIG. 2. FIG. 2 also shows no other vibration isolator 10 or metal jacket riser member 30 in off-center positioning behind the vibration isolator 10 and metal jacket riser member 30 shown. While centered positioning of indentations 6 that support vibration isolators 10 and metal jacket riser members 30 is preferred due to the narrow width contemplated for top surface 14, centered positioning of indentations 6 is not considered critical. FIG. 2 also shows the sloping/tapered configuration of walls 4 and with its vertical ribbing 16, and the dissimilar configurations of the two opposed protrusions 8b at the end of riser block 2 closest to a viewer, which are used to keep adjacent riser blocks 2 in stacked array from sticking together. FIG. 3 is a top view of the most preferred embodiment of the present invention furnace riser block 2 that shows the wide flange 12 structure depending from opposed side walls 4, mismatched protrusion 8b configuration and placement, off-center placement for opposed protrusion 8a, downwardly sloping/tapered walls 4 on all sides of the riser block 2 between its top surface 14 and flange 12, and three of its top indentations 6 supporting a vibration isolator 10. Although FIG. 3 shows the portion of flange 12 outwardly depending from end walls 4 to be smaller than the portion of flange 12 outwardly depending from side walls 4, the size and configuration of flange 12 is not limited to that shown in FIG. 3 as long as the goal of providing a large width-to-height ratio is achieved for enhanced stability. Furthermore, although the positioning and configuration of vertical ribbing 16 shown in FIG. 3 is preferred in the present invention, they are also not limited to that shown in FIG. 3 as long as the structural strength of riser blocks 2 for vertical loading is not diminished and they still remain able to successfully support a heavy furnace unit 18 for extended periods of time measured in years. FIG. 3 also shows an aligned positioning for indentations 6, which although not critical is preferred due to the relatively narrow width dimension of top surface 14. As previously mentioned in the discussion of FIG. 1, the positioning of vibration isolators 10 shown in FIG. 3 would be for a furnace unit 18 having a large configuration, and vibration isolators 10 may be used with other selections of indentations 6 to support and quiet smaller furnace units 18. FIG. 4 is a bottom view of the most preferred embodiment of the present invention furnace riser block 2 showing its hollow interior and the small indents 8a and 8b of mismatched configuration and/or positioning (that respectively form protrusions 8a and 8b at the interface of flange 12 and wall 4), and which can be used to prevent adjacent riser blocks 2 from sticking together in stacked array when alternate riser blocks 2 in the array are rotated 180-degrees to align indents/protrusions 8a and 8b that are mismatched in configuration and/or positioning. FIG. 4 also shows the indentations 6 extending downwardly from top surface 14, which are also shown in FIGS. 1 and 3. In addition vertical ribbing 6 and flange 12 are also marked for reference in FIG. 4. FIG. 5 shows four present invention furnace riser blocks 2 spaced-apart from one another in a fluid collection pan 20 that is set upon adjacent roof rafters 22, with the weight of a furnace unit 18 supported across the spaced-apart rise blocks 2. The four riser blocks 2 have their side walls 4 facing one another and are in substantially aligned array. The number of riser blocks 2 needed to support a furnace unit 18 depends on its configuration and weight. The use of a fluid collection pan 20 is not critical under riser blocks 2, but is preferred in many applications. The collection of structural features provided in present invention furnace riser blocks 2 allows for even flow of plastic material during manufacture and the avoidance of weak spots, and allows them to be manufactured ten times stronger than prior art metal furnace supports.

Furthermore, FIGS. 6 and 7 show an example of a vibration isolator 10 that can be used as a part of the present invention in association with the indentations 6 on the top surface 14 of riser blocks 2, while FIG. 8 shows an example of a metal jacket riser member 30 that can be used as a part of the present invention while mounted within the center through-hole 24 of a vibration isolator 10. FIG. 6 is a top view of a vibration isolator 10 that can be used with the most preferred embodiment of the present invention furnace riser block 2 to support and quiet a furnace unit 18. The center through-hole 24 is configured and optionally used to receive a metal jacket riser member 30 and optionally provide additional clearance needed under a furnace unit 18 by local building code or installation site limitation. FIG. 7 is a perspective view of the edge of the upper portion 26 and lower portion 28 of the vibration isolator 10 shown in FIG. 6, with the diameter dimension for upper portion 26 being significantly larger than that of lower portion 28. Although not marked by numerical designation in FIG. 7, the lower portion 28 of vibration isolator 10 is shown to have multiple circumferential ribs, and the interface between upper portion 26 and lower portion 28 has a broadened configuration to help maintain vibration isolators 10 within an indentation 6 while a heavy furnace unit 18 slides across top surfaces 14. FIG. 8 is a side view of a metal jacket riser member 30 that can be used with a vibration isolator 10 and the most preferred embodiment of the present invention furnace riser block 2 to provide additional clearance needed under a supported furnace unit 18. FIG. 8 shows a flange 34 extending outwardly from top portion 32, with a narrower bottom portion (not marked with numerical designation) depending downwardly from top portion 32. A crimped indentation 36 in top portion 32 is also shown, which may be used to help release metal jacket riser member 30 from its secure position within the through-hole of a vibration isolator 10 that is mounted within an indentation 6. The vibration isolator 10 shown in FIGS. 6 and 7 is only an example of one means for providing air circulation between furnace unit 18 and top surface 14 and/or quieting noisy furnace units 18. The upper portion 26 of any vibration isolator used (10 or other) should be large relative to the lower portion 28 beneath it, with most of the lower portion 28 being inserted into an indentation 6 and the underside surface of upper portion 26 providing a large area of contact with the top surface 14 of riser blocks 2 that help to resist roll-over and/or separation of vibration isolator (10 or other) from its associated indentation 6 as a heavy furnace 18 is moved over it for installation into a preferred position of use. Also, the vibration isolator (10 or other) used with indentations 6 should have additional means associated with its stem that are adapted to help it to resist popping out of its associated indentation 14 as furnace 18 is moved it and into a preferred position of use, such as but not limited to the multiple circumferential ribs shown in FIG. 7.

When a furnace unit 18 is in its desired position of use supported on multiple riser blocks 2, with vibration isolators 10 positioned between its bottom surface and riser blocks 2, several air circulation gaps will be present between furnace unit 18 and top surfaces 14 of riser blocks 2 that allow the exterior bottom surface of the elevated furnace unit 18 to dry out after exposure to moisture/condensation, thereby reducing the risk of deterioration due to the presence of corrosion and/or mold. Risk of corrosion is also reduced in large part by the sloping/tapered walls 4 that are all configured to disperse water downwardly away from furnace unit 18, helping to reduce maintenance issues for furnace unit 18 and prolong its useful life. Although not limited thereto, a preferred height dimension for present invention riser block 2 is approximately six inches. Furthermore, when used with a fluid collection pan 20 having a width dimension of approximately thirty inches, present invention riser blocks 2 would each preferably have an approximate length dimension of approximately twenty-eight to twenty-nine inches. The width dimension for present invention riser blocks 2 is not critical as long as a large width-to-height ratio is maintained, but preferably is less than eight inches. Thus, when the height dimension of a present invention riser block is six inches and its width dimension is between six inches and eight inches, its width-to-height ratio would be greater than one. The multi-level integrated structure of present invention riser blocks 2 also strengthens them and provides a material cost advantage by allowing less material to be used to achieve adequate strength for long term support of a furnace unit 18. The use of vibration isolators 10 also provides increased ease of handling for installers, as vibration isolators 10 allow a heavy furnace unit 18 to be temporarily positioned on, or slide across, any riser block 2 during installation without damage to the structural integrity of riser blocks 2 or any fluid-collection pan 20 positioned beneath them. Although not shown, it is preferred for present invention riser blocks 2 to be manufactured via molded construction from a single sheet of plastic material. Although the material used for riser blocks 2 can vary, sturdy and impact-resistant materials are preferred that also are crack-resistant, corrosion-resistant, extremely durable (more than twice as strong as standard ABS plastic), fire-resistant, and resistant to extreme temperatures without deforming from their original configuration or becoming brittle. Resistance to UV radiation is not necessarily a contemplated feature of the present invention, unless dictated by an application. Also, more than one riser block 2 could be made from each sheet of plastic material to reduce production cost. Manufacture of the present invention could be accomplished by blow molding, injection molding, assembly of pre-formed individual components, or a combination thereof, with the choice of manufacturing being determined by the anticipated purchase cost to consumers and the expected duration of use without maintenance, parts replacement, or repair. The sturdy materials used for construction of present invention riser blocks 2, and the elevated structure of riser blocks 2 are all designed to reduce pressure points, cracks, thin spots, and other sources of material deterioration that during handling and installation could worsen and prevent risers 2 from effectively fulfilling their intended functions.

What is claimed is:

1. A strong furnace support used in pairs and larger multiples to support a heavy furnace unit, said furnace support comprising:
    a riser block having two downwardly-sloping side walls in positions opposed from one another, two downwardly-sloping end walls in positions opposed from one another, and a top surface, said walls contiguous with said top surface and one another, and said walls also each having a lower end and being generally shaped as an isosceles trapezoid;
    vertical ribbing integral with each of said side walls that creates a scalloped configuration, with said vertical ribbing also configured and positioned to maximize vertical loading capability of said riser block;
    a flange outwardly-depending from said lower ends of said side walls and said end walls; and
    a plurality of indentations extending into and below said top surface, said indentations in spaced-apart array across said top surface, wherein when the lower portion of a vibration isolator is inserted into selected ones of said indentations, and a heavy furnace is supported by multiple ones of said furnace supports with multiple vibration isolators therebetween, long duration support of the heavy furnace is provided while the vibration isolators assist in quieting its operation.

2. The furnace support of claim 1 wherein said riser block is made via molded construction from corrosion-resistant plastic material.

3. The furnace support of claim 2 wherein said corrosion-resistant plastic material is selected from a group consisting of non-flammable materials, materials having a high resistance to extreme temperatures, and vibration absorbing materials.

4. The furnace support of claim 2 wherein said vertical ribbing, said indentations, and said flange are configured to produce even material thickness in said riser block during manufacture, thereby reducing weak spots and pressure points in said riser block to enhance its strength and durability.

5. The furnace support of claim 1 wherein said flange has non-sharp edges and corners.

6. The furnace support of claim 1 wherein one of said indentations is positioned in central location on said top surface.

7. The furnace support of claim 1 further comprising a plurality of protrusions adjacent to said lower ends of said walls, said protrusions selected from a group consisting of protrusions mismatched in configuration and protrusions mismatched in location, said protrusions also configured and positioned so that when adjacent ones of said riser blocks are rotated 180-degrees from one another and placed in a stacked array, individual ones of said riser blocks can be easily and promptly released from said stacked array without sticking to the ones of said riser blocks remaining in said stacked array.

8. The furnace support of claim 7 wherein said protrusions consist of four corner protrusions and two side protrusions offset to the same side of a centered location.

9. The furnace support of claim 1 further comprising a plurality of vibration isolators, and wherein at least one of said vibration isolators is secured within one of said indentations in said top surface of said riser block, and a like number of said vibration isolators are also secured within selected other ones of said indentations.

10. The furnace support of claim 9 wherein said vibration isolators are further configured and positioned to provide air circulation between a supported furnace unit and said riser block, which in combination with said downwardly-sloping configuration of said side walls and said end walls reduces the incidence of corrosion and mold on the furnace unit supported by said riser block, helping to reduce maintenance issues for the supported furnace unit and prolong its useful life.

11. The furnace support of claim 9 further comprising a plurality of metal jacket riser members, and wherein at least one of said metal jacket riser members is secured within the topmost one of each said vibration isolators associated with said indentations on said top surface of said riser block.

12. The furnace support of claim 1 wherein the portion of said flange adjacent to said side walls has a greater width dimension than the portion of said flange adjacent to said end walls.

13. A strong furnace support used in pairs and larger multiples to support a heavy furnace unit, said furnace support comprising:
    a riser block made via molded construction from corrosion-resistant plastic material and having two downwardly-sloping side walls in positions opposed from one another, two downwardly-sloping end walls in positions opposed from one another, and a top surface, said walls contiguous with one another and said top surface, said walls each having a lower end, said walls also each having a shape generally that of an isosceles trapezoid, and said riser block having a width-to-height ratio greater than one;
    vertical ribbing integral with each of said side walls that creates a scalloped configuration having a continuous series of arcuate projections when viewed in cross-section;
    a flange outwardly-depending from said lower ends of said side walls and said end walls; and
    a plurality of indentations in said top surface with one of said indentations in a centered location on said top surface; and
    a plurality of protrusions adjacent to said lower ends of said walls, said protrusions selected from a group consisting of protrusions mismatched in configuration and protrusions mismatched in location, said protrusions also configured and positioned so as to allow easy and prompt release of said riser block from a stacked array of like ones of said riser block when adjacent ones in the stacked array are rotated 180-degrees from one another, wherein when the lower portion of a vibration isolator is inserted into selected ones of said indentations, and a heavy furnace is supported by multiple ones of said furnace supports with multiple vibration isolators therebetween, long duration support of the heavy furnace is provided while the vibration isolators assist in quieting its operation.

14. The furnace support of claim 13 wherein said corrosion-resistant plastic material is selected from a group consisting of non-flammable materials, materials having a high resistance to extreme temperatures, and vibration absorbing materials.

15. The furnace support of claim 13 wherein said vertical ribbing, said indentations, and said flange are configured to produce even material thickness in said riser block during manufacture, thereby reducing weak spots and pressure points in said riser block to enhance its strength and durability.

16. The furnace support of claim 13 wherein said flange has non-sharp edges and corners.

17. The furnace support of claim 13 wherein said protrusions consist of four corner protrusions and two side protrusions offset to the same side of a centered location.

18. The furnace support of claim 1 further comprising a plurality of vibration isolators and a plurality of metal jacket riser members, and wherein said vibration isolators are selectively secured to said indentations in said top surface of said riser block, and selected ones of said metal jacket riser members are secured within the topmost one of each said vibration isolators associated with said top surface of said riser block.

19. A method of supporting a heavy furnace unit, said method comprising the steps of:

providing multiple ones of said furnace supports disclosed in claim 1, vibration isolators, and a heavy furnace unit;

placing multiple ones of said riser blocks with said side walls facing one another in spaced-apart and substantially aligned array;

associating said vibration isolators with selected ones of said indentations in said top surfaces of said riser blocks;

moving said furnace unit over said riser blocks with said vibration isolators therebetween; and lowering said furnace unit onto said riser blocks for long duration support of said furnace unit during its operation while said vibration isolators assist in quieting furnace unit operation.

20. The method of claim 19 wherein the order of said step of placing multiple ones of said riser blocks with said side walls facing one another and said step of associating said vibration isolators with selected ones of said indentations is reversed.

* * * * *